US006973056B2

(12) United States Patent
Tonella

(10) Patent No.: US 6,973,056 B2
(45) Date of Patent: Dec. 6, 2005

(54) INFORMATION TRANSMITTING AND RECEIVING METHOD AND CORRESPONDING TRANSMITTER AND RECEIVER

(75) Inventor: Maurizio Tonella, Corbetta (IT)

(73) Assignee: SGS-Thomson Microelectronics S.r.l., Agrate Brianza (IT)

( * ) Notice: Subject to any disclaimer, the term of this patent is extended or adjusted under 35 U.S.C. 154(b) by 926 days.

(21) Appl. No.: 09/901,460

(22) Filed: Jul. 9, 2001

(65) Prior Publication Data

US 2002/0097741 A1 Jul. 25, 2002

Related U.S. Application Data

(63) Continuation of application No. 08/670,457, filed on Jun. 26, 1996, now abandoned.

(30) Foreign Application Priority Data

Jun. 30, 1995 (EP) ................................ 95830276

(51) Int. Cl.[7] .......................... H04J 15/00; H04H 1/00
(52) U.S. Cl. ...................................... 370/312; 370/464
(58) Field of Search ............................... 370/345, 464, 370/486–487, 498, 310, 312, 328

(56) References Cited

U.S. PATENT DOCUMENTS 3,760,371 A 9/1973 Pitroda et al.
4,551,842 A 11/1985 Segarra
4,987,571 A 1/1991 Haymond et al.
5,321,696 A 6/1994 Buchholz et al.
5,398,243 A 3/1995 Aguilhon et al.
5,515,372 A * 5/1996 Porter ........................ 370/312
5,581,576 A 12/1996 Lanzetta et al.
5,613,065 A 3/1997 Ishibashi et al.
5,802,066 A 9/1998 Miyake et al.
6,021,160 A 2/2000 Kaku et al.

FOREIGN PATENT DOCUMENTS

EP 0 495 136 A 7/1992
EP 5 517 609 A 12/1992
WO WO 95 12265 A 5/1995

OTHER PUBLICATIONS

European Search Report from European Patent Application 95830276.2, filed Jun. 30, 1996.
Specifications of the Radio Data System RDS for VHF/FM Sound Broadcasting; Mar. 1984, pp. 1-60, Tech. 3244-E.

* cited by examiner

*Primary Examiner*—Seema S. Rao
*Assistant Examiner*—Kevin C. Harper
(74) *Attorney, Agent, or Firm*—Lisa K. Jorgenson; James H. Morris; Wolf, Greenfield & Sacks, P.C.

(57) ABSTRACT

In transmission systems whereby data packets of a single type and having a fixed structure are used to transmit a given type of information, the invention optimizes the transmission by utilizing data packets of the same type to transmit information of different types and by differentiating the information transmitted in such packets by the rate of re-transmission thereof. In an application of the invention to RDS systems, the block PS is used to transmit both the program service name, as usual, and the radio text, and arrangements are made for the rate of re-transmission of the service name to be high and that of the text to be low, or possibly zero.

12 Claims, 2 Drawing Sheets

INFORMATION TRANSMITTING AND RECEIVING METHOD AND CORRESPONDING TRANSMITTER AND RECEIVER

This application is a Continuation of prior application Ser. No.: 08/670,457, filed on Jun. 26, 1996, entitled INFORMATION TRANSMITTING AND RECEIVING METHOD AND CORRESPONDING TRANSMITTER AND RECEIVER, now abandoned.

BACKGROUND OF THE INVENTION

1. Field of the Invention

The present invention relates to transmission and reception methods, as well as to a transmitter and a receiver for their implementation.

2. Discussion of Related Art

Radio Data Systems (RDS) are systems for broadcasting a sound signal through double transmission; that is, systems whereby a data signal is sent in addition to a sound signal to carry information related to the transmitting station and the transmitted program. It is possible that similar systems also will be used in the future to broadcast television signals, for example.

Such systems have been standardized in Europe as “RDS” by CENELEC and in the United States as “RBDS” by NRSC, and are subject to recommendations by CCIR. Fairly small differences exist between the various specifications which have been summarized, for example, by T. Beale and D. Kopitz in an article entitled “RDS in Europe, RBDS in the USA,” EBU Technical Review, Spring 1993, incorporated herein by reference. The acronym RDS will be used hereinafter to designate any double transmission system regardless of its particular standards.

Current RDS systems cover a very large number of services and, accordingly, the amount of information to be transmitted is large, but the available bandwidth for the data signal is only (approximately) 1000 bits/second (BPS). Such being the conditions, it is extremely important that full advantage be taken of the transmissive capacity of RDS systems, especially if more than one service is to be provided at one time.

The data signal used by RDS systems has the structure shown in FIG. 1 of the accompanying drawings. This structure consists of a sequence of groups GG, each composed of four blocks B1, B2, B3, B4, and each block being made up of a 16-bit information word IW and a 10-bit control word CW. Several different types of groups and blocks are provided. Each group type is composed of predetermined block types. A particular group type can be recognized by the informational contents of a sub-word GT of the word IW in the block B2 of each group GG. This, at least, is the currently used European standard. Among the block types are the following: a program identification block PI to let the receiver informed of the transmitting station’s identity, a program service name block PS to inform the receiver of the name used in running the wireless broadcasting service, a radio text block RT for sending miscellaneous messages to the receiver, such as advertisements or captions to be displayed to the user.

Certain groups (and their component blocks) are sent repeatedly and frequently. A high rate of re-transmission of these groups may, on occasion, be of use, or, as is most often the case, prove to be redundant. For example, transmission of the service name PS, located in block B4 of group 0A, often proves to be redundant.

This invention is directed toward optimizing the transmission of information in RDS systems and in fixed structure data transmission systems in general.

SUMMARY OF THE INVENTION

The above object is achieved by a transmission method and device, and a reception method and device having novel features and advantages.

The idea on which the invention stands is that of using data packets of the same type to transmit different types of information, and of re-transmitting the information in such packets at different rates (depending on the data packet type).

With RDS systems, for example, the block PS is used to transmit both the program service name, as usual, and the radio text, and arrangements are made for the rate of re-transmission of the service name to be high and that of the text to be low, or possibly zero.

An embodiment of the invention is directed towards a method of transmitting information. The method comprises the steps of: (a) repeatedly transmitting at least data packets of a particular type, (b) classifying information contained in the data packets, and (c) transmitting the information, for a number of times which is related to a class associated therewith, through the data packets of the particular type.

Another embodiment of the invention, which is also directed towards a method of transmitting information, includes the steps of: (a) classifying a plurality of information types into a plurality of classes, (b) repeatedly transmitting data packets of a particular type at least some of which including at least one of the information types, (c) controlling how frequently each of the information types is included in the data packets of the particular type based upon the class of the information type.

Another embodiment of the invention is directed towards a method of receiving information. The method comprising the steps of: (a) repeatedly receiving at least data packets of a particular type, (b) storing informational contents of the received data packets of the particular type, and (c) classifying the informational contents according to a number of times that it has been received.

Another embodiment of the invention, which is also directed towards a method of receiving information, includes the steps of: (a) repeatedly receiving data packets of a particular type, at least some of which including at least one of a plurality of information types, (b) classifying the information types into a plurality of classes based upon how frequently each of the plurality of information types is included in the data packets of the particular type.

Yet another embodiment of the invention is directed towards a transmitter of information. The transmitter comprises: (a) a storage means adapted to contain information to be transmitted and to store the information to be transmitted in such a manner that it can be distinguished by a class associated therewith, (b) a read means adapted to select and read the information to be transmitted from the storage means as well as to prepare a digital signal including a sequence of data packets of which at least some are of the particular type, the read means being effective to repeatedly transmit the data packets of the particular type, classify the information contained in the data packets, and transmit the information, for a number of times which is related to a class associated therewith, through the data packets of the particular type, and (c) a transmitting means adapted to receive the digital signal and to transmit it physically on a transmissive medium.

Another embodiment of the invention, directed to a transmitter system, includes:

(a) a storage medium configured to store a plurality of information types and data relating to classifications of the information types, and (b) a transmitter coupled to the storage medium to receive the information types and data relating to classifications of the information types and physically transmit a plurality of data packets of a particular type, the transmitter configured to include different information types in the data packets of the particular type by including the different information types in the data packets of the particular type at different rates.

Yet another embodiment of the invention is directed towards a receiver of information. The receiver includes: (a) a receiving means adapted to physically receive a signal from a transmissive medium and to output at least a corresponding digital signal including a sequence of data packets of which at least some are of the particular type, (b) a storage means adapted to contain received information and to store the received information in such a manner that it can be distinguished by a class associated therewith, and (c) a write means adapted to extract at least data packets of the same type from the digital signal and to write at least the informational contents thereof into the storage means, the write means being effective to repeatedly receive the data packets of the particular type, store informational contents of the received data packets of the particular type, and classify the informational contents according to a number of times that it has been received.

Another embodiment, directed towards a receiver system, includes: (a) a receiver configured to receive a signal including a plurality of data packets of a particular type and to classify information types included in the data packets of the particular type into classes by determining how frequently the information types are included in the data packets of the particular type, and (b) a storage medium coupled to the receiver to store the information types according to the classes of the information types.

BRIEF DESCRIPTION OF THE DRAWINGS

The invention can be more clearly appreciated from the following description when read in conjunction with the accompanying drawings, in which.

DETAILED DESCRIPTION

Figure 1:
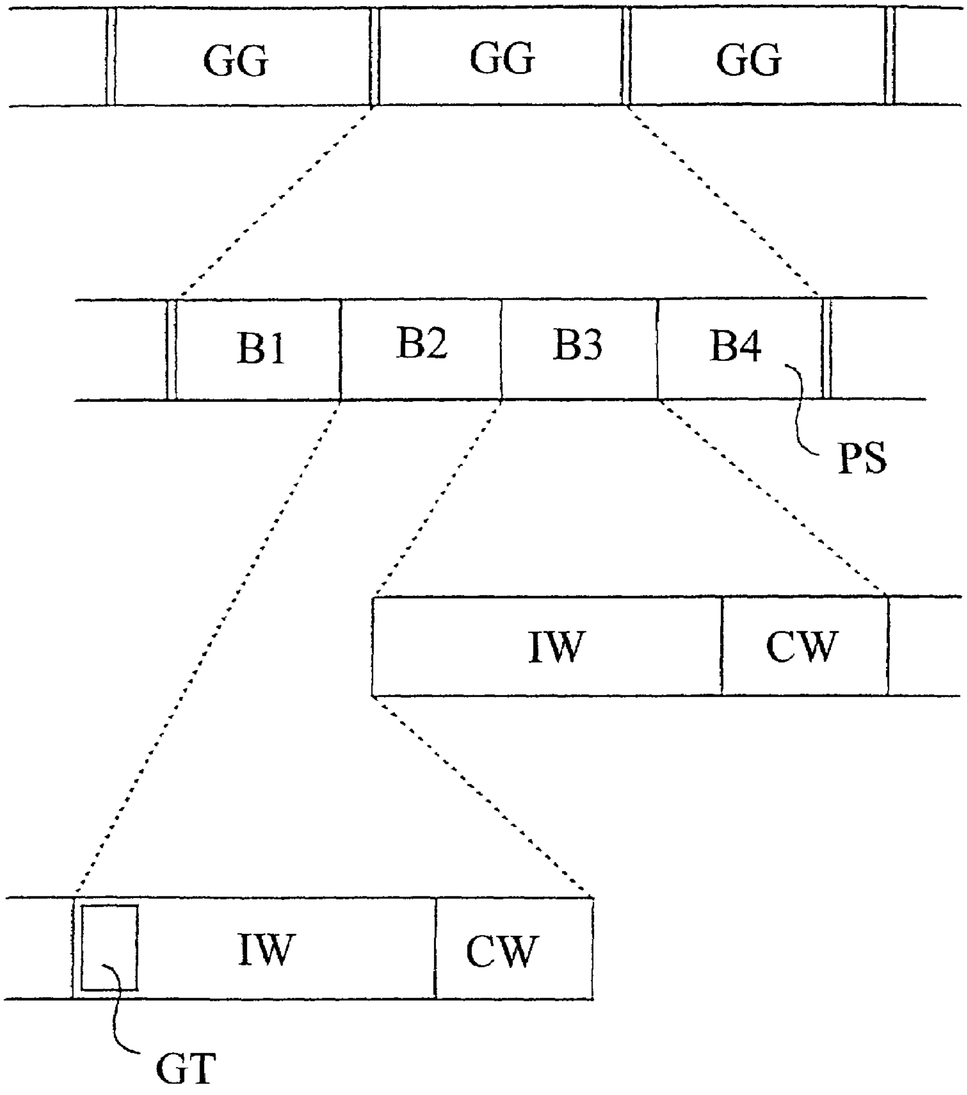
FIG. 1 illustrates the structure of the data signal used in an RDS system according to the prior art and this invention.

The most commonly used methods of transmitting information require data packets to be sent repeatedly that are of the same type, are comprised of the same sequences of bits, and have the same structure. In that structure, a first group, usually a majority of the bits, is allotted to the information proper, and a second group of bits is allotted to service information, such as the sender and the addressee of the packet, the type of data contained in the packet, or the error correction, for example.

This invention provides a method of sending the information about the type of data contained in the packet, without sending any specific bits. The term "classes" of information will be used hereinafter to indicate any characteristics by which information can be distinguished and classified.

Assume that sequences of personal names formed, for simplicity, by one surname word and one first name word, each having no more than 15 characters, are to be transmitted using data packets that have a fixed structure, wherein 120 bits are allotted to the information proper. The method of this invention provides for the information to be first classified by distinguishing the surnames from the first names, and then for the transmission, using the aforementioned data packets, of the information associated with the "surname" class for a first number of times and the information associated with the "first name" class for a second number of times. A simple possibility is to transmit each surname twice consecutively, and then to transmit the related first name once. Assume now that a third class of information representing the total number of surname/first name pairs already transmitted is to be transmitted occasionally to enable the receiver to check to see that no information has been lost; then, in accordance with the invention, this third class of information can be transmitted from time to time, by means of a data packet, a third number of times, e.g., thrice consecutively.

A class also may signify what importance is attached to the information being (correctly) transmitted and received. Suppose that information about the fill level of a vat that is being monitored for overflow is to be transmitted, and that information about the temperature of the vat contents also is to be transmitted. In accordance with the invention, the fill level information, which carries greater importance, can be transmitted at frequent intervals, e.g., at least 10 times a minute, whereas the temperature information, of lesser importance, could be transmitted less frequently, e.g., no more than once every minute. For the fill level information to be recognized, it is necessary that different data packets include the same fill level information, which would be true if the vat fill level changed slowly.

Still in connection with the vat example above, assume that the fill level information is represented by a number between 0 and 50, and that the temperature information also is represented by a number in the 0 to 50 range. Upon receiving a sequence such as (24 24 24 20 23 23 22 22) or (24 24 24 23 20 23 22 22), the receiver would immediately understand that number 20 therein represents temperature information, because it is never re-transmitted, whereas the fill level information is transmitted at least twice—although not necessarily consecutively, as in the case of number 23 in the second sequence.

Identification of particular classes of data in this manner requires that the transmitted information be counted in some fashion. Since this counting provides the basis for classifying the information by the receiver, it is necessary that the receiver be able to decide when the counting is to be interrupted or evaluated for classifying purposes. As used herein, a "count" refers to a number of times that a particular information item is transmitted according to a particular counting scheme. Two counting schemes can be used to determine a count: a first scheme is based on time, and a second scheme is based on the number of data packets received. These schemes coincide when the packets happen to be all of one type and are sent at a fixed re-transmission rate. In the first case, the receiver surveys the received data for data packets of the type of interest within a time window of predetermined duration, and then performs the same survey within a new time window, which may partly overlap the former window. In the second case, the receiver surveys the received data for data packets of the type of interest within a first group formed by a certain number of consecutively received data packets, which may be the type of interest or any other type, and next surveys a second group, similar to the first, which might have data packets in common with the first group.

In certain applications, it may be convenient to take account of the time lapse that separates information items being transmitted repeatedly, which time lapse may be selected according to the classes of the data being surveyed.

Throughout the above discussion, the assumption has been made that the information being transmitted, i.e., the first name, surname, temperature, or fill level, is fully contained within a single data packet. However, the invention is not limited to this particular possibility. In general, a method is provided whereby the receiver can determine where an item of information begins and ends. There are essentially two ways of achieving this: (1) either using information items of a predetermined fixed length (e.g., four data packets), or (2) using information bit strings inserted in the last data packet.

The reception method of the invention follows directly from the transmission method.

It is presumed that the receiver is sent (repeatedly) data packets of the same type, and will store them to later analyze their contents. For the purpose of implementing the present method, however, it would be sufficient to have only the informational contents of the data packets stored. Nevertheless, it is possible that for the receiver to store the incoming data packets in full. It is also possible that in many applications the receiver would be sent varying types of data packets, and that it would use the present method for only one type. In such a case, however, the expectation is that the receiver usually would store all the data received.

The information transmitted according to the invention is recovered from the informational contents of the incoming data packets. In the most basic of cases, there would be no data reconstruction to perform; in other cases, however, the operation of reconstructing the information may entail, for example, the application of error correction codes, or the gathering together of the informational contents of a number of data packets, as previously discussed.

The reconstructed data information is then classified according to the number of times that each information item has been received; specifically, the incoming data packets having the same informational contents need to be counted.

Assume that the informational contents of each data packet corresponds to a single character, and that the following characters are received:

12:25Cr12:25CrQWERTYUIOPASDFGCr12:25Cr12:25Cr12:25Cr where Cr is the ASCII return character, often used in computers to signal the end of a document line. The receiver will store the sequence of characters and reconstruct the information in the following manner:

12:25 12:25 QWERTYUIOPASDFG 12:25 12:25 12:25 and will rank the information "12:25" in a first class, since it has been received five times, and rank the information "QWERTYUIOPASDFG" in a second class, since it has been received only once.

Alternatively, assume now that the informational contents of each data packet corresponds to five characters, that each information item corresponds to a data packet, and that the following packets are received:

12:25 12:25 QWERT YUIOP ASDFG 12:25 12:25 12:25

In this case, no reconstruction step will be required and the receiver will proceed with the classifying step directly. The information "12:25" will be entered in a first class, since it has been received five times, and the information "QWERT", "YUIOP" and ASDFG" will be entered in a second class, since they have been received only once each.

Of course, the meaning of the different classes will have to be known to the receiver, so that it can make proper use of the received and classified information. In both of the examples given above, the first class corresponds to the time of the day, while the second may be an alphanumeric message. The received information could, for example, be displayed by the receiver. In such a case, different classes of information could correspond to different display times. For example, the time of day could be displayed consecutively for at least 30 seconds, and the alphanumeric message could be displayed for 10 seconds.

The same considerations made for the transmission method also apply to the count.

The transmission and reception methods just described find particularly advantageous applications in RDS systems. For such systems, the data packet may correspond to a group GG or a block B.

To make the best use of the transmissive capacity of the data signal, the block PS is utilized to transmit both the program service name and the radio text.

The receiver is able to identify the blocks PS because these blocks occupy the fourth place in the groups 0A and 0B, and the third and fourth places in the groups 15A. As previously explained, the receiver can identify the groups on account of a suitable sequence GT of bits being provided in each block B2 of each group GG; each block PS contains two characters in the information word IW.

According to the currently applicable standard, the program service name comprises eight characters—any unused characters should be blanks—and is transmitted by means of four blocks PS. In the present method, the radio text is of necessity a multiple of eight characters, which is compatible with the current standard providing for a radio text length of thirty-two or sixty-four characters, depending on whether it is transmitted in a block RT contained in the group 2B or 2A, respectively. In addition, the radio text transmitted by the present method has no limitations on its length and only requires a necessary minimum of eight characters. The following sequence represents a range of permissible numbers of radio text characters that can be transmitted according to present standards: 8, 16, 24, 32, 40, 48, . . . , 64, 72, 80, . . .

As for the count, a viable strategy consists of sending the service name of the station, which belongs to a first class, at least twice consecutively, and sending the radio text, which belongs to a second class, only once.

It is important that the receiver learn the program service name within a short time, so that it can display it to its user. Accordingly, two iterations of the service name should be sent periodically at frequent intervals, even where the radio text to be sent is extensive. Where three different information classes are to be sent, such as a service name, the time of day and a varied message, a different number of re-transmissions may be selected for each class, e.g., three for the service name, two for the time of day, and one for varied message.

Other strategies are conceivable that are more complicated than the consecutive re-transmission method, but these strategies do not appear to offer any special advantages in RDS systems.

To implement the methods described in the foregoing, a special transmitter and special receiver with appropriate features should be provided.

Figure 2:
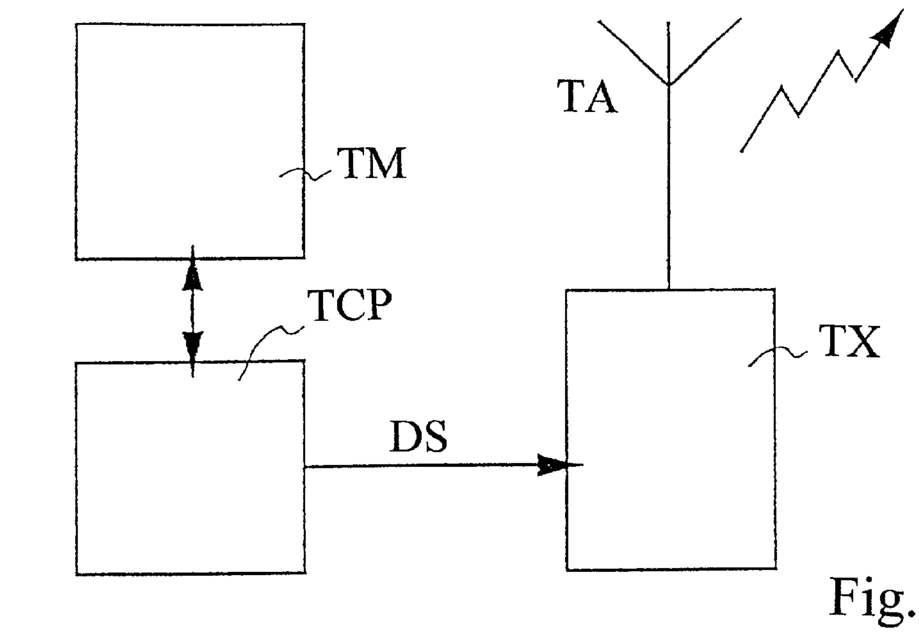
FIG. 2 is a block diagram of a transmitter according to the invention.

A transmitter of this special type comprises, as shown in FIG. 2, a storage means TM adapted to contain information to be transmitted, a read means TCP adapted to select and read the information to be transmitted and to prepare a digital signal DS comprising a sequence of data packets, of which at least some are the same type, and a transmit means TX adapted to receive the digital signal DS and transmit it physically on a transmissive medium. The transmissive medium, in this example, is the air. The physical transmission takes place via a transmitting aerial TA. This design is basic for a transmitter of digital signals.

Compared to conventional arrangements, the storage means TM is adapted to store information to be transmitted such that it can be distinguished by a class associated therewith, and the read means TCP is adapted to implement the transmission method of this invention; this read means TCP often consists essentially of a microprocessor or a digital signal processor (DSP), whereby the implementation of the method requires appropriate programming of the processor. Where the read means TCP is implemented with unprogrammed dedicated logic, it usually is synthesized in an automatic manner according to particular specifications.

There are two ways of storing information so that it can be distinguished by a class associated therewith: a first way consists of storing the class for each group of information items, and a second way consists of allotting different storage areas for information from different classes and storing the information in its proper area.

Where this method is applied to systems of the RDS type, the transmitter construction is much more complicated. However, for the purposes of this invention, it will be sufficient, in general, that a conventional transmitter be used and its control program altered to suit the desired method.

Figure 3:
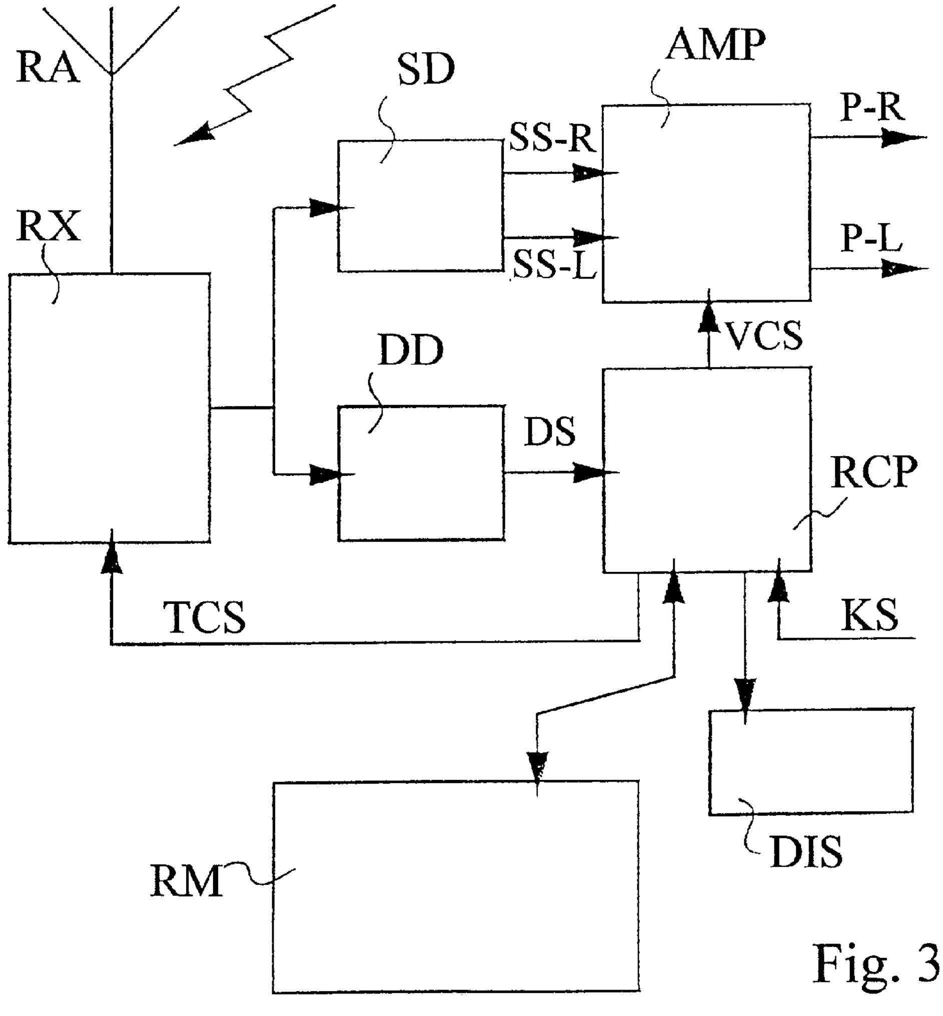
FIG. 3 is a block diagram of a receiver according to the invention.

A receiver of this special type comprises, as shown in FIG. 3, a receive means corresponding in FIG. 3 to the blocks RX, SD, DD adapted to physically receive a signal from a transmissive medium and output at least one corresponding digital signal DS which comprises a sequence of data packets of which at least some are the same particular type, a storage means RM adapted to contain received information, and a write means RCP adapted to extract data packets of at least the particular type from the digital signal DS and to write at least their informational contents into the storage means RM. Where the transmissive means is the air, this physical reception will take place through a receiving aerial RA, this being the usual arrangement for digital signal receivers.

Compared to conventional arrangements, the storage means RM is adapted to store the incoming information such that it can be distinguished by classes associated therewith, and the write means RCP is adapted to implement the transmission method of this invention. The write means RCP comprises a microprocessor or DSP, so that the implementation of the method will be dependent on a suitable programming of the processor. Where the write means RCP is implemented with unprogrammed dedicated logic, it usually is synthesized in an automatic manner according to particular specifications.

Shown best in FIG. 3 is the architecture of an inventive receiver of the RDS type, which also corresponds to that of a conventional receiver.

The receive means connected to the receiving aerial RA comprises a block RX which receives a radio frequency signal and outputs a low-frequency signal. This low-frequency signal is supplied to a sound decoder SD which will output a right audio signal SS-R and a left audio signal SS-L, and is supplied to a digital signal decoder DD which will output a digital signal DS. The signals SS-R and SS-L are passed to a stereo amplifier AMP which will output a signal P-R to a right loudspeaker and a signal P-L to a left loudspeaker. The signal DS goes to the write means RCP; the latter represents the intelligent core of the receiver and is connected to the read/write storage means RM, and to a display DIS for displaying information to the user. In addition, the write means RCP receives a keyboard signal KS to receive commands from the user, and outputs a first control signal VCS, e.g., for controlling the amplifier AMP gain, and a second control signal TCS, e.g., for controlling the block RX tuning. Compared to conventional arrangements, the write means RCP is adapted to implement the reception method of this invention.

With the method of this invention, as implemented by such an architecture, different types of information transmitted by data packets of a single type can be displayed. In fact, once the information has been received and classified by the write means RCP, this same means can control the display DIS, for example, to simultaneously display information associated with at least two different classes (e.g., a service name and a varied message) at predetermined locations on the display DIS. Alternatively, the write means RCP could cause the display to be dependent on a user's commands entered on the keyboard of the receiver and received through the signal KS. A combination of these two alternatives is the permanent displaying of the service name at a first location and the displaying of either the time of the day or the various message, at the user's discretion, at a second location.

During a transition phase, that is, before the receiver is able to classify the incoming information, the receiver may take, for example, the information incoming first as the service name and display it as such. Subsequently, once the classifying is completed, the receiver can amend the display as required.

Similar to many modem receivers (such as car radio receivers), the preselection of a limited number of programs can be provided. This preselection is normally obtained by storing tuning information into a storage means. In the arrangement of FIG. 3, this storage means may be the storage means RM. To best implement the method of this invention, it is advantageous if, for each preselected program, the block PS associated with at least one predetermined class is also stored by the storage means RM. It would be convenient, of course, to store at least the class selected that is associated with the program service name. In fact, assuming that a given program is selected, it would be possible to display immediately the proper service name, without waiting for the write means RCP to store a sufficient number of blocks PS to complete a classification. After the write means RCP have completed such operations, it would still be possible to check to see that the service name is the correct one, as it is bound to be in most cases, and to amend it if necessary.

As previously mentioned, the service name identification operation may take a fairly long time (e.g., a few seconds), which will depend on what and how many other information items are transmitted through the block PS. It may be advantageous, therefore, for the write means RCP to be arranged to perform an initial scanning procedure on the operational band of the receiver and then reserve the scanned information for subsequent storage. This pre-scanned information would include at least the service names of programs received in the area where the receiver is located. Of course, such information could be stored in the storage means RM. Since such an initial scanning is sure to take a long time, it either may be arranged for the scanning to be initiated at the user's request, or initiated automatically during periods when the receiver is not used, for example, when the receiver is turned off. In this manner, upon tuning in a fresh program, the receiver would be able to display the program name at once.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A method of receiving information in a Radio Data System (RDS) of broadcasting, comprising the steps of:

repeatedly receiving at least data packets of a particular type including at least a first and second type of coded messages;

storing informational contents of the received data packets of said particular type into at least a first and a second class type; and classifying the informational contents according to a number of times that it has been received.

2. A method according to claim 1, wherein said number of times is related to one of consecutive time intervals of predetermined length and a predetermined number of consecutively received data packets.

3. A method according to either claim 1, wherein the data packets of said particular type are of a type used in RDS systems and correspond to an information word adapted to contain a service name of a program.

4. A receiver of information in a Radio Data System (RDS) of broadcasting adapted to repeatedly receive at least data packets of a particular type, comprising:

a receiving means adapted to physically receive a signal from a transmissive medium and to output at least a corresponding digital signal including a sequence of data packets of which at least some are of said particular type including at least a first and a second type of coded messages;

a storage means adapted to contain received information and to store said received information in such a manner that it can be distinguished by a class associated therewith into at least a first and a second class type; and a write means adapted to extract at least data packets of said same type from said digital signal and to write at least the informational contents thereof into said storage means, said write means being effective to repeatedly receive the data packets of the particular type, store informational contents of the received data packets of said particular type, and classify the informational contents according to a number of times that it has been received.

5. A receiver according to claim 4, wherein the data packets of the particular type correspond to an information word adapted to contain a service name of a program.

6. A receiver according to claim 5, including a display and a control means connected thereto and adapted to display, either simultaneously or as selected, information contained in data packets of said same type associated with at least two different classes.

7. A receiver according to claim 5, including a further storage means for storing tuning information on preselected programs, wherein said further storage means is adapted to also contain, for each preselected program, a service name of a program associated with at least one given class.

8. A receiver according to claim 5, including a further storage means for storing service names of programs associated with at least one given class, for programs being transmitted in a predetermined frequency band, and the control means connected thereto and adapted to produce a scanning and selective storage procedure for said band.

9. The receiver system as claimed in claim 4, further comprising a display coupled to at least one of the storage medium and the receiver and configured to display at least one of the information types.

10. The receiver system as claimed in claim 4, further comprising a sound decoder coupled to the receiver to decode an audio signal and an amplifier coupled to the sound decoder to amplify the audio signal.

11. A method for receiving information in a Radio Data System (RDS) of broadcasting the information being coded messages of data packets, comprising the steps of:

repeatedly receiving data packets of a particular type, including at least a first and a second type of coded messages; and classifying the information types into at least a first and second class type based upon how frequently each of the plurality of information types is included in the data packets of the particular type.

12. The method of claim 11, wherein the step of classifying the information types into a plurality of classes based upon how frequently each of the plurality of information types is included in the data packets of the particular type is performed by determining how frequently each of the plurality of information types is included in the data packets of the particular type in relation to one of a preselected time interval and a preselected number of consecutive receptions of the data packets of the particular type.

* * * * *